United States Patent [19]

Pratt

[11] 4,451,189

[45] May 29, 1984

[54] BULB RIVET

[75] Inventor: John D. Pratt, Rancho Cucamonga, Calif.

[73] Assignee: Monogram Industries, Inc., Santa Monica, Calif.

[21] Appl. No.: 242,892

[22] Filed: Mar. 12, 1981

[51] Int. Cl.³ .............................................. F16B 13/04
[52] U.S. Cl. ...................................... 411/34; 411/43; 411/70; 29/522 A
[58] Field of Search ............................ 411/34, 37–41, 411/43, 55, 70; 29/509, 512, 522 A, 523

[56] References Cited

U.S. PATENT DOCUMENTS

| Re. 20,055 | 8/1936 | Huck | 411/43 |
| 2,030,167 | 2/1936 | Miller | 411/34 |
| 2,526,235 | 10/1950 | Huck | 411/43 |
| 2,536,353 | 1/1951 | Cooper | 411/70 |
| 2,763,314 | 9/1956 | Gill | 411/34 |
| 3,107,572 | 10/1963 | Orloff | 411/34 |
| 3,148,578 | 9/1964 | Gapp | 411/34 |
| 3,426,375 | 2/1969 | Jeal | 411/43 |
| 4,312,613 | 1/1982 | Binns | 411/34 |
| 4,376,604 | 3/1983 | Pratt et al. | 411/70 |

FOREIGN PATENT DOCUMENTS 2315031  1/1977  France ............................... 411/43

Primary Examiner—Gary L. Smith
Assistant Examiner—Neill Wilson
Attorney, Agent, or Firm—Poms, Smith, Lande & Rose

[57] ABSTRACT

A blind fastener, producing a large blind side bulb, and including a locking ring to hold the fastener in a secured position against stresses. A collapsible barrel segment is disposed on the blind side between the end of the body portion and the head of the pull stem to effect the expansion of the body portion on the blind side. The barrel resists collapsing under loads sufficient to expand and flare the body portion of the fastener to produce the desired large bulb but collapses upon satisfactory flaring having been accomplished. The collapsible barrel, being collapsible along an angle, makes the fastener particularly well-adapted for fastening non-parallel surfaces.

15 Claims, 13 Drawing Figures

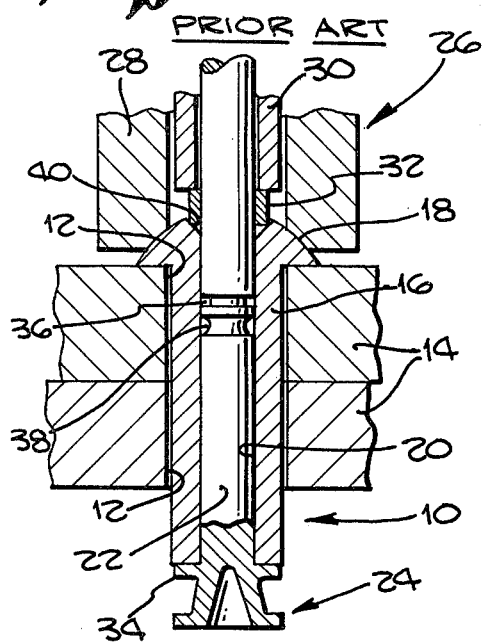
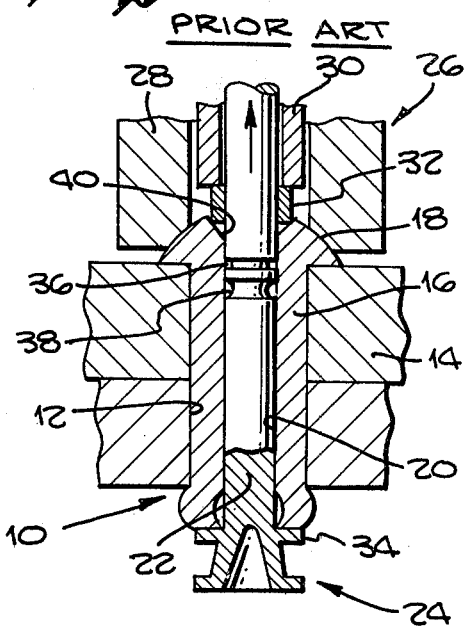
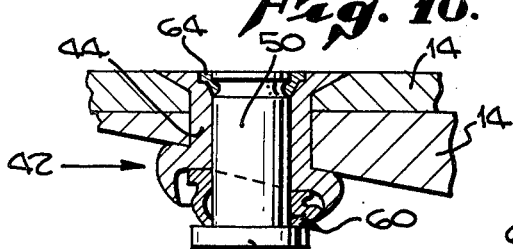
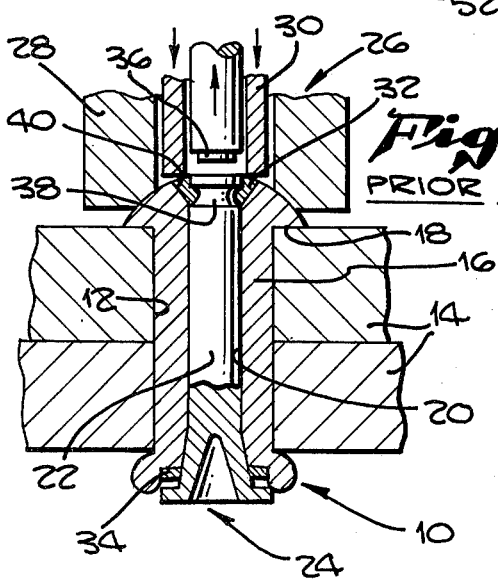
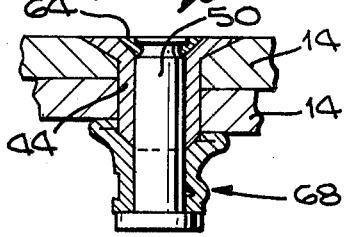
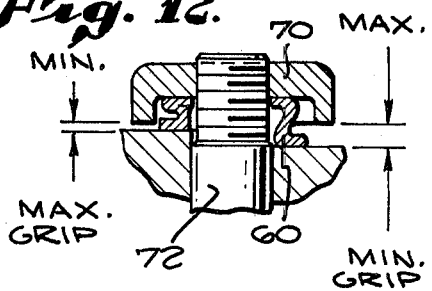

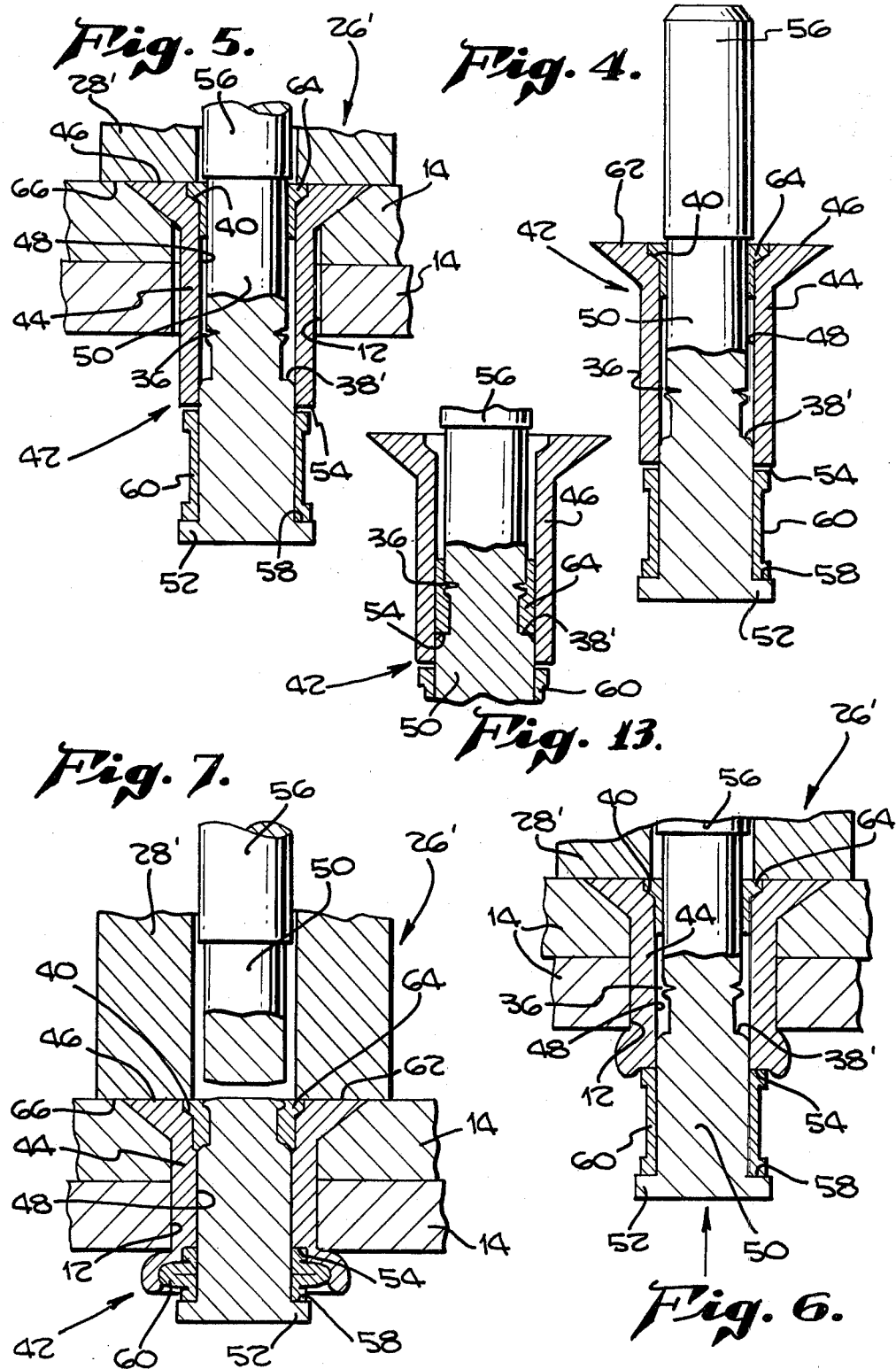

BULB RIVET

BACKGROUND OF THE INVENTION

The present invention relates to blind fasteners and, more particularly, to blind fasteners of the bulb rivet type employed primarily in aircraft and the like.

Blind fasteners are used in a variety of applications wherein access to the blind side of surfaces being connected together is reduced or non-existent. Various particular applications impose unique, stringent requirements for which the fastener must be particularly adapted.

The applications in which rivets or fasteners are used in the assembly of aircraft and the like impose some of the most stringent requirements. In particular, the fasteners must completely fill the holes through which they are passed in order to eliminate shifting movements, they must produce a large bulb on the blind side, and they must resist losing their gripping power under the stresses and vibrations imposed upon them by the environment in which they are used.

Referring to FIGS. 1-3, a prior art bulb rivet type fastener, as presently employed in the aircraft industry, is shown. The rivet of FIGS. 1-3 is a simplified drawing of the fastener disclosed in U.S. Pat. No. 3,148,578 to R. H. Gapp. As seen in FIG. 1, the fastener, generally indicated as 10, is passed through a common pair of bores 12 and panels 14, being connected together. Fastener 10 comprises a body portion 16 having a head 18 on the outside. Body portion 16 and head 18 have a longitudinal bore 20 therethrough, through which a pull stem 22 is disposed. Pull stem 22 has a head portion, generally indicated as 24, on the blind side of fastener 10 and extends beyond head 18 to be gripped by a tool used for setting the fastener 10 in the manner to be described.

To set the fastener 10, a special tool is required. The tool, a portion of the nose portion thereof being indicated as 26, has three interacting nose pieces. The outer one, indicated as 28, bears against the head portion 24 of fastener 10. Within outer nose piece 28 is intermediate sleeve 30 which bears against a locking ring 32, concentrically disposed about pull stem 22 which locks the fastener 10 in its secured position in a manner to be described hereinafter. Within intermediate sleeve 30, a pair of jaws or other gripping means are provided (not shown) which grip the pull stem 22 and impart a pulling force thereon to set the fastener 10.

Turning, now, to FIG. 2, in order to set the fastener 10, the setting tool 26 first imparts a drawing or pulling motion on the pull stem 22 while the outer nose piece 28 is positioned against head 18. The head portion 24 of the pull stem 22 has a frangible collar 34 formed adjacent to the inner end of body portion 16. From the frangible collar 34, head portion 24 tapers outwardly. As pull stem 22 is pulled towards the head 18 of fastener 10, the frangible collar 34 bears against the inner end of body portion 16. This has two effects. First, body portion 16 is compressed and caused to completely fill the space between pull stem 22 and bores 12 and panels 14. Next, the portion of body portion 16 extending beyond the inner surface of panels 14 is flared and compressed outwardly to form the desired bulb as shown beginning in FIG. 2.

Because it is desired to produce a smooth outer surface on the head 18 of fastener 10, it is characteristic of such fasteners in this particular environment that the setting stroke of the setting tool 26 is fixed. That is, the pull stem 22 will be pulled towards the head 18 a fixed distance so that when it shears in the manner to be described hereinafter, the shear point will be at the outer surface of head 18. To accomplish this, the setting tools 26 are adjustably set to produce a given, fixed setting distance. Since it is impossible to guarantee a uniformly exact thickness of panels 14 being interconnected, provision must be made in such bulb rivet fasteners to guarantee an optimal blind side bulb despite minor variations in thickness of the panels 14 in the presence of the constant distance through which the pull stem 22 is pulled. In the prior art fastener of Gapp shown in FIGS. 1-3, the frangible collar 34 provides this function. Upon the inner portion of body portion 16 achieving the desired configuration of bulb, the resistance to further deformation is sufficient to cause the frangible collar 34 to break away from the pull stem 22. Because of the outward taper of head portion 24, frangible collar 34 is thereafter forced down toward head portion 24 in a wedging action for the balance of the movement of pull stem 22.

Pull stem 22 is provided with a pair of contiguous grooves. One is a break goove 36 and the other is a locking groove 38. The break groove 36 is adjacent to and above the locking groove 38 and slightly deeper so that upon resistance of a certain threshold amount, the pull stem 22 will break at the break groove 36. This action, and the locking of fastener 10, can be seen with reference to FIG. 3. When the desired maximum draw on pull stem 22 has been obtained, the intermediate sleeve 30 is activated to push the locking ring 32 along the pull stem 22. As can be seen, head 18 is provided with an angled recess 40 about the center. With the pull stem 22 at its maximum pull position, angled recess 40 is aligned with locking groove 38 so that as the intermediate sleeve 30 is forced downward towards head 18, the locking ring 32 is deformed into the combined groove formed by locking groove 38 and angled recess 40 to provide both a smooth surface between head 18 and pull stem 22 and, additionally, lock the pull stem 22 against movement in the opposite direction. Thereafter, the fitting tool 26 further pulls on the pull stem 22, causing the pull stem 22 to break at break groove 36 completing the setting of the fastener 10. As can be seen, the desired results are obtained.

The fastener as just described has certain drawbacks. Primarily, a special setting tool 26, as described, is required. Due to the nature of the setting tool, more than normal provision must be made when different size fasteners are being used.

Additionally, the frangible collar 34 does not provide a uniform compressive force about the bores 20 if the panels 14 are not parallel on their two outer surfaces. For example, it is sometimes desired or required to use such a blind fastener to connect two panels which are tapered such as the panels 14 of FIG. 10 or which are of different thicknesses adjacent the bores as with the panels 14 in FIG. 11. In such case, the maximum thickness will be controlling and cause the frangible collar 34 to break from the pull stem 22. Thereafter, very little, if any further compressive force is imparted to the body portion 16 and the bulb, as formed to that point, remains.

Wherefore, it is the object of the present invention to provide a bulb rivet type fastener which can be set with a conventional setting tool and which provides for uniform compressing force of the bulb in the case of tapered or stepped surfaces being joined.

SUMMARY

The foregoing objectives have been met in a blind rivet having a body portion with a head on one end and a longitudinal bore therethrough and a pull stem disposed in the bore with a head portion adapted for abutting the inner end of the body portion and upsetting it to form a bulb end as the pull stem is pulled toward the head of the body portion, the pull stem having a break groove to sever when the rivet is set and a locking groove for receiving a locking ring to maintain the rivet in its set state, by the improvement comprising a collapsible barrel concentrically disposed about the pull stem between the inner end of the body portion and the head portion of the pull stem, the collapsible barrel being able to withstand a compressive force sufficient to upset the body portion and form the desired bulb end thereon but being adapted to collapse upon further compression under force after the desired bulb end has been formed.

DESCRIPTION OF THE DRAWINGS

FIGS. 1-3 show a prior art bulb rivet as intended to be replaced by the bulb rivet of the present invention in various stages of setting.

FIG. 4 is a cut-away side elevation of the bulb rivet of the present invention.

FIGS. 5, 6 and 7 are cut-away side elevations of the bulb rivet of the present invention in various stages of setting.

FIG. 10 is a side cut-away elevation showing the bulb rivet of the present invention as employed to fasten a tapered panel to a flat panel.

FIG. 11 is a cut-away side elevation showing how the collapsible cylinder of the present invention when employed to fasten panels together adapts to a finite grip range when used with another type fastener.

FIG. 12 is a side cut-away view of the cylinder of the present invention used with a nut and bolt.

FIG. 13 shows an alternate position for the locking collar.

DESCRIPTION OF THE PREFERRED EMBODIMENT

Figure 8:
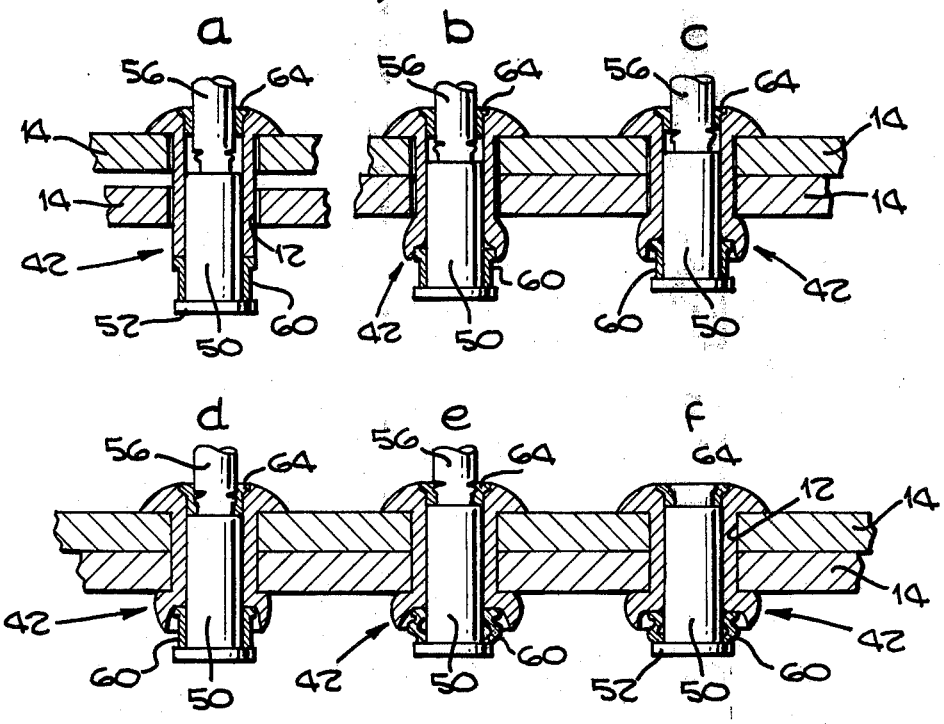
FIG. 8 shows in sequence the various discrete stages of setting of the bulb rivet of the present invention.

Turning first to FIG. 4, the rivet fastener of the present invention is shown in cut-away side elevation and generally indicated as 42. Fastener 42 comprises a body portion 44 having a head 46 on one end and a longitudinal bore 48 therethrough. A pull stem 50 is disposed within bore 48 having a head portion 52 on the end thereof adjacent the inner end 54 of body portion 44. The outer end 56 of pull stem 50 would typically be provided with serrations for pulling with the specific geometry thereof defined by the pulling tool to be employed. This feature is well known in the art and forms no particular part of the present invention.

Head portion 52 of pull stem 50 comprises a ridge extending radially outward along the inner end so as to form a shoulder 58 generally parallel to inner end 54 of body portion 44. In actual practice, it is preferred to have the shoulder 58 tapering downward toward the pull stem 50 slightly in order to create a holding effect on the barrel to be described hereinafter. A barrel 60 is disposed about the pull stem 50 between inner end 54 and shoulder 58. Barrel 60 is designed to be collapsible in a controlled manner. The load-versus-deflection curve for a typical barrel is shown in FIG. 9. The barrels can be produced in various cross-sectional configurations. A straight cylinder can be employed or a raised portion can be used on one or both ends to cause the deflection of the sidewalls upon compressing to take place in a desired manner. For example, the barrel as shown in FIGS. 4-7 has raised portions on both ends which would tend to cause the collapsing to take place adjacent the middle of the barrel. By contrast, the example shown in FIG. 8 and as diagrammed in FIG. 9 employs a barrel with a raised end disposed adjacent the inner end 54 of the body portion 44. This causes the maximum buckling and attendant deformation of the barrel 60 to take place adjacent the head portion 52 of pull stem 50. As can be seen from the curve of FIG. 9, however, the raised portions take no part in the forces required to buckle the barrel 60. Rather, it is a function of the outside diameter of the buckling portion (labeled "D"), the sidewall thickness (labeled "C"), and the length of the collapsible portion (labeled "L"). The forward slope of all curves reflects the elastic modulus of the barrel material. For example, steel is equal to $30 \times 10^6$ Ksi. The modulus of the center portion of each curve is a function of D/C (and possibly of L). Ideally, the selection of material and geometric configuration of the barrel 60 should be such as to achieve a curve such as labeled "small C." What this indicates is that a gradually increasing force will be applied to the body portion 44 by barrel 60 up to the point of buckling and, thereafter, a second, lower, force will be created throughout the buckling of barrel 60. By way of example of an actual embodiment as employed, a barrel for a 5/32 rivet has a length L of 0.120 inches, a wall thickness C of approximately 0.014 inches, and an outside diameter D of 0.146 inches.

As will be seen in discussions hereinafter, the collapsible barrel of the present invention also is adaptable as a novel feature to other forms of fasteners.

The preferred embodiment of the rivet fastener 42 of the present invention includes a second point of novelty. Referring briefly, once again, to the prior art of FIGS. 1-3, it will be noted that the pull stem 22 therein completely filled the inner bore 20 such that the locking ring 32 was maintained outside of head 18 until the locking groove 38 aligned with the angled recess 40 allowing the locking ring 32 to be forced into position by the intermediate sleeve 30 of setting tool 26.

Turning once again the FIG. 4, it can be seen that the center portion of pull stem 50, having the break groove and locking groove therein, is configured in a different manner and is smaller in overall size than the inside diameter of longitudinal bore 48. In particular, the locking groove 38' is the point of demarcation for the two different sizes of diameter for the pull stem 50. At the sidewall of locking groove 38' on the inner end, the diameter of pull stem 50 is a slide fit to the longitudinal bore 48. From there to at least the outer surface 62 of head 46, the diameter of the pull stem 50 is a clearance fit in a manner to be described hereinafter. Once again, the depth of the break groove 36 must be deeper than the depth of the locking groove 38' in order to cause the fracturing of the pull stem 50 at the desired point to effect a smooth outer surface 62 upon the completion of the setting of the rivet 42.

As with the prior art fasteners employing a locking ring, the fastener 42 includes recess 40 within the outer surface 62 of head 46 concentrically disposed about the longitudinal bore 48 whereas the locking ring 32 of the prior art was configured as a substantially cylindrical collar disposed about outer end 56 of pull stem 50 to be forced into position after the pull stem 50 had completed its pulling to set the rivet, the fastener 42 employes a locking collar 64 configured as shown with a wide portion disposed within the recess 40 of head 46 and a narrow portion extending along the pull stem 50 between the pull stem 50 and the longitudinal bore 48. If desired, the position of the locking collar 64 can be reversed as shown in FIG. 12 wherein the wide portion is disposed within the locking groove 38' and the narrow portion extends upward in the space between the pull stem 50 and the longitudinal bore 48. According to either manner of positioning the locking collar 64, the mode of operation will be substantially the same.

The operation of the rivet of the present invention can be seen in its three major stages FIGS. 5, 6, and 7. In FIG. 6, the fastener 42 is positioned within the common bore 12 of panels 14. The setting tool 26' contains only an outer nose piece 28' and a gripping jaw (not shown) for gripping and pulling the pull stem 50. It will be noted that the face 66 of the outer nose piece 28' covers both the outer surface 62 of head 46 as well as the exposed portion of locking collar 64. Thus, nose piece 28' of setting tool 26' both maintains the fastener 42 within the bores 26 and the locking collar 64 within the head 46.

Turning now to FIG. 6, it can be seen that as pull stem 50 is withdrawn by the setting tool 26' towards head 46, barrel 60 works along the rising edge of the curve shown in FIG. 9 as a function of the elastic modulus of the barrel material thus compressing the material of the body portion 44 of fastener 42 into the bores 12 and deforming the portion of body portion 44 extending beyond the panels 14 into its bulbed shape.

In FIG. 7, the setting has been complete and the pull stem 50 fractured at the break groove 36. As can be seen, the barrel 60 has now buckled to prevent undue deforming of the bulb beyond the desired point and, additionally, the locking collar 64 has been deformed by the compressive pressure between the nose piece 28' and the wider bottom shoulder of locking groove 38' so as to completely fill the space there between and create the desired locking action. It can be understood that if the locking collar 64 were disposed as shown in FIG. 12, this compressive action would be identical upon the upper edge of locking collar 64 making contact with the face 66 of outer nose piece 28' of setting tool 26'.

Figure 9:
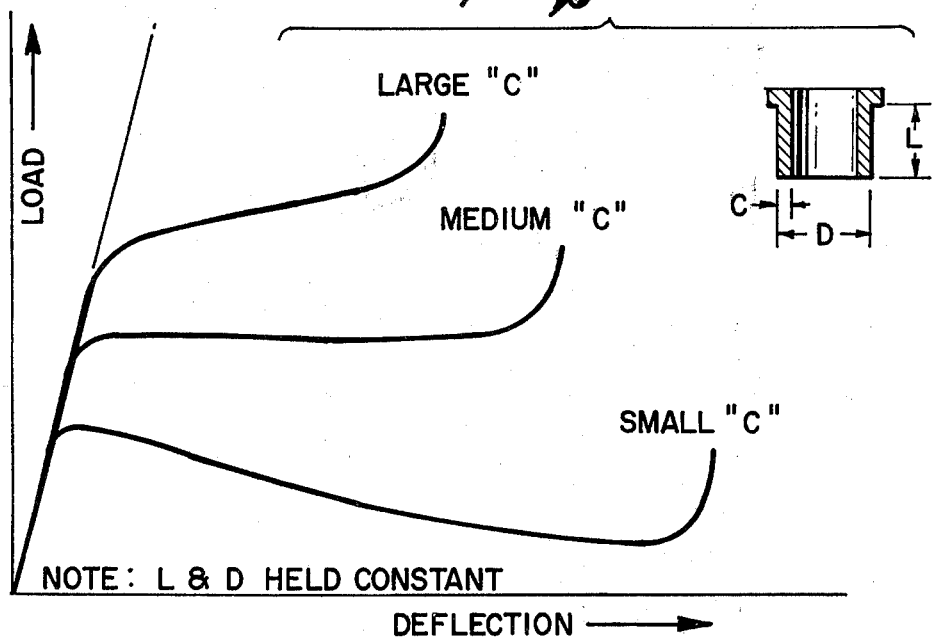
FIG. 9 is a load-versus-deflection curve of the collapsible barrel of the present invention.

This same setting sequence is shown in greater detail in the six rivets of FIG. 8 shown in various stages of setting. The rivet at position "A" has been positioned through the bores and setting has not yet begun. In the rivet of position "B", compression has just begun and the body portion has not yet expanded to fill the bores 12. In the rivet of position "C", the bulb is forming and the body portion is expanding out to fill the bores 12. In the rivet of position "D", the body has expanded to its maximum amount and the bulb has completely formed. As exemplified by the rivet of position "E", thereafter, the barrel 60 has begun buckling and no further deformation of either the body or bulb portion takes place. In the rivet of position "F," the pull stem "F" has been withdrawn to its fixed maximum amount and the fracturing thereof has taken place so that the rivet of position 50 is shown in its fully set position. Note that the bulb is completely formed, the body portion completely fills the bores 12, and the barrel 60 is in a collapsed state but under a constant force against the bulb as dictated by the modulus of the appropriate curve.

Turning now to FIGS. 10 and 11, other benefits of the bulb rivet of the present invention can be seen. In FIG. 10, the inner panel 14 is tapered so that the outer surfaces are not parallel. By contract to the frangible collar 34 of the prior art fastener discussed hereinbefore, the barrel 60 is capable of collapsing only when the force level required to cause collapsing is obtained. This is independent about its circumference. Thus, as shown, the wider portion of the barrel collapses first and the remaining portion continues to impart its deforming force against the body portion 44 of fastener 42 until complete deformation adjacent the panel surface is obtained and, only then, does it collapse so that resultant bulb is configured as shown with complete compression about its periphery.

As discussed briefly earlier, the concept of the collapsing barrel can be used with other fasteners. For example, in the fastener of FIG. 11, the barrel 60 has been incorporated within a flaring sleeve 68 so that within the finite grip range accommodate, equal compressive forces will be created.

In like manner, in FIG. 12, a barrel 60 of the collapsing type as hereinbefore described is disposed between a nut 70 and the surfaces being joined as the nut is screwed onto a bolt 72. As opposed to employing a standard washer in the position of barrel 60, barrel 60, once buckled, creates a uniform compressive force between a range of first compression and complete compression as indicated by the designations "maximum grip" and "minimum grip" shown therein. As necessary, the use of such a barrel will also impart a preselected amount of compressive force such as obtained when a torque wrench is employed. That is, by preselecting the collapsing nature of the barrel, the nut can be screwed on until collapse of the barrel is begun and, if the collapsing characteristics are chosen with a flat slope as indicated as "MEDIUM D" in FIG. 9, a known force will be created thereby.

Thus, it can be seen that the fastener of the present invention has not only obtained its objectives, but, additionally, has provided a novel means of imparting a force within a fastener as can be employed in other fasteners with attendant benefits.

Wherefore, having thus described my invention, I claim:

1. In a blind rivet having a body with a head on one end and a longitudinal bore therethrough and a pull stem disposed in the bore with a head adapted for abutting the inner end of the body and upsetting it to form a bulb end as the pull stem is pulled toward the head of the body, the pull stem having a break groove to sever when the rivet is set, the improvement comprising:
 a collapsible barrel concentrically disposed about the pull stem between the inner end of the body and the head of the pull stem, said collapsible barrel being structured to withstand a longitudinal compressive force sufficient to upset the body and form the desired bulb end thereon but being further structured to collapse upon further compression under force after the desired bulb end has been formed, said collapsible barrel not having progressive longitudinal strain hardening, and wherein said collapsible barrel is cylindrical and has thickened sidewalls adjacent each end whereby said collapsing thereof occurs in the center portion thereof.

2. In a blind rivet having a body with a head on one end and a longitudinal bore therethrough and a pull stem disposed in the bore with a head adapted for abutting the inner end of the body and upsetting it to form a bulb end as the pull stem is pulled toward the head of the body, the pull stem having a break groove to sever when the rivet is set, the improvement comprising:

a collapsible barrel concentrically disposed about the pull stem between the inner end of the body and the head of the pull stem, said collapsible barrel being structured to withstand a longitudinal compressive force sufficient to upset the body and form the desired bulb end thereon but being further structured to collapse upon further compression under force after the desired bulb end has been formed, said collapsible barrel not having progressive longitudinal strain hardening, and wherein said collapsible barrel is cylindrical and has thickened sidewalls adjacent to the inner end of the body whereby said collapsing thereof occurs adjacent the head of the pull stem.

3. In a blind rivet having a body with a head on one end and a longitudinal bore therethrough and a pull stem disposed in the bore with a head adapted for abutting the inner end of the body and upsetting it to form a bulb end as the pull stem is pulled toward the head of the body, the pull stem having a break groove to sever when the rivet is set, the improvement comprising:

a collapsible barrel concentrically disposed about the pull stem between the inner end of the body and the head of the pull stem, said collapsible barrel being structured to withstand a longitudinal compressive force sufficient to upset the body and form the desired bulb end thereon but being further structured to collapse upon further compression under force after the desired bulb end has been formed, said collapsible barrel not having progressive longitudinal strain hardening, and wherein additionally:

(a) the pull stem has a locking groove for receiving a locking ring to maintain the rivet in its set state;

(b) the pull stem between the locking groove and the head of the pull stem is a slide fit within the longitudinal bore of the body;

(c) the pull stem between the locking groove and the head of the body is a clearance fit within the longitudinal bore of the body;

(d) the head of the body has a recess concentrically disposed about the longitudinal bore of the body for receiving a portion of a locking ring when the blind rivet is set so as to cooperate with the locking groove and the locking ring in holding the rivet in its set conditions; and additionally comprising;

(e) a locking ring disposed about the pull stem and positioned to be compressed between the edge of the locking groove and the nose piece of the tool used to set the rivet as the rivet is set and adapted to be formed thereby into said locking groove and said recess in the head, said locking ring having a portion thereof disposed in the clearance space between the pull stem and the walls of the bore before the rivet is set; and, wherein, prior to the rivet being set, the balance of said locking ring is disposed in said recess.

4. In a fastener for passing through a bore in a work piece having a head on one end for abutting the outer surface of the workpiece at one end of the bore and a member operably attached to the other end for creating a compressive force against the outer surface of the workpiece at the other end of the bore, the improvement for creating a known compressive force comprising:

a collapsible barrel detached from said fastener and concentrically disposed about the fastener between the member and the surface of the workpiece, said barrel being collapsible between a non-collapsed state and a collapsed state, said collapsible barrel further being structured to withstand a longitudinal compressive force less than the desired known compressive force but being further structured to collapse upon the compressive force reaching the desired known compressive force to thereby create said known compressive force when said barrel is between said non-collapsed and said collapsed states.

5. The improvement to a fastener of claim 4 wherein:
(a) the fastener is a blind rivet; and
(b) the member is the head of a pull stem disposed in a longitudinal bore in the blind rivet.

6. The improvement to a fastener of claim 5 wherein:
(a) the rivet comprises a first portion disposed within the bore and a second portion disposed on the pull stem between said first portion and said pull stem head; and,
(b) said collapsible barrel is disposed between said second portion and said pull stem head.

7. In a blind rivet having a body with a head on one end and a longitudinal bore therethrough a pull stem disposed in the bore with a head adapted for abutting the inner end of the body and deforming it to set the rivet as the pull stem is pulled toward the head of the body, the head of the body having a recess concentrically disposed about the longitudinal bore for receiving a locking ring, the pull stem having a locking groove for receiving a locking ring, and a locking ring disposed concentrically about the pull stem to engage the recess and the locking groove to maintain the rivet in its set state, the improvement comprising:

(a) the pull stem between the locking groove and the head of the pull stem being a slide fit within the longitudinal bore of the body;

(b) the pull stem between the locking groove and the head of the body being a clearance fit within the longitudinal bore of the body;

(c) the locking ring is disposed about the pull stem and positioned to be compressed between the edge of the locking groove and the nose piece of the tool used to set the rivet as the rivet is set and adapted to be deformed thereby into the locking groove and the recess, the locking ring having a portion thereof disposed in the clearance space between the pull stem and the walls of the bore before the rivet is set and wherein, prior to the rivet being set, the balance of the locking ring is disposed in the recess.

8. In a blind rivet having a body with a head on one end and a longitudinal bore therethrough with a pull stem disposed in the bore having one end extending out through the head for gripping and pulling by a setting tool and the other end provided with a head adapted to contact said body on said other end and deform a portion of the body to set the rivet, the improvement to allow proper setting of the rivet by a setting tool with a finite grip range despite variation in material thickness comprising:

a collapsible barrel detached from said body and concentrically disposed about the pull stem between the body other end and the head of the pull stem, said collapsible barrel including a front end adjacent said body other end, said collapsible barrel being structured to withstand a longitudinal compressive force sufficient to deform the body portion into the desired set shape thereof but being further structured to collapse upon further compression under force after the desired set shape has been formed.

9. The improvement to blind rivet of claim 8 wherein: said collapsible barrel is cylindrical and has uniformly thick sidewalls along its length.

10. The improvment to blind rivet of claim 8 wherein: said collapsible barrel is cylindrical and has thickened sidewalls adjacent each end whereby said collapsing thereof occurs in the center portion thereof.

11. The improvement to a blind rivet of claim 8 wherein: said collapsible barrel is cylindrical and has thickened sidewalls adjacent to the inner end of the body whereby said collapsing thereof occurs adjacent the head of the pull stem.

12. The improvement for creating a known compressive force in accordance with claim 4 wherein the other end of said fastener is threaded and said member is a nut.

13. The improvement according to claim 12 wherein said collapsible barrel has uniform strain hardening.

14. The improvement according to claim 8 wherein said collapsible barrel is structured so that the force which must be applied to collapse said barrel is substantially constant or decreases as said barrel is collapsed.

15. The improvement according to claim 4 wherein said collapsible barrel is structured so that the force which must be applied to collapse said barrel is substantially constant as said barrel is collapsed.

* * * * *